Dec. 22, 1959  G. JANONIS  2,918,320
VEHICLE DOOR LATCH
Filed Sept. 17, 1956  2 Sheets-Sheet 1
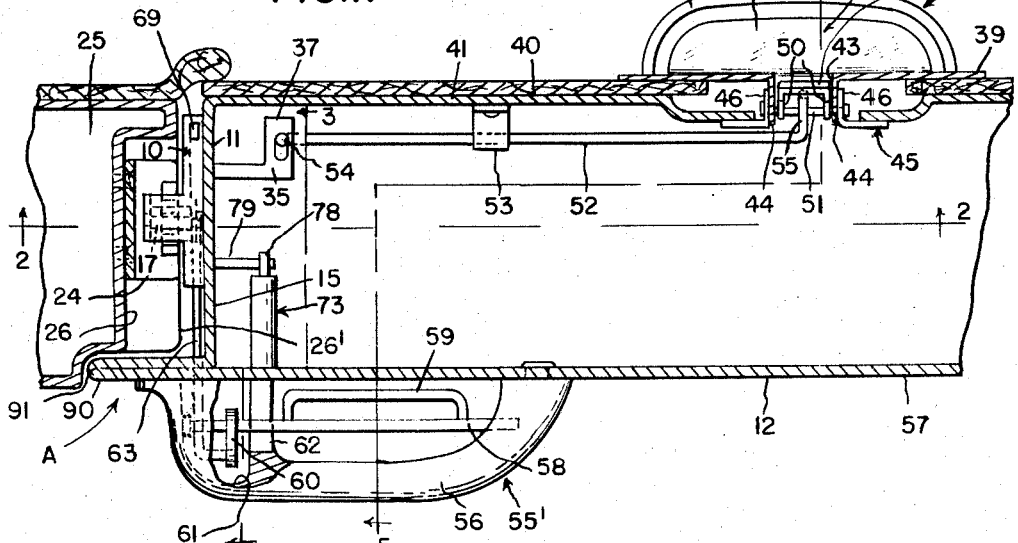
FIG.1.
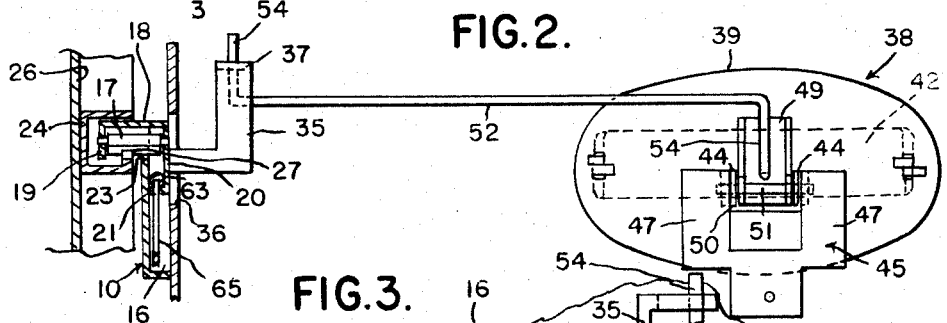
FIG.2.
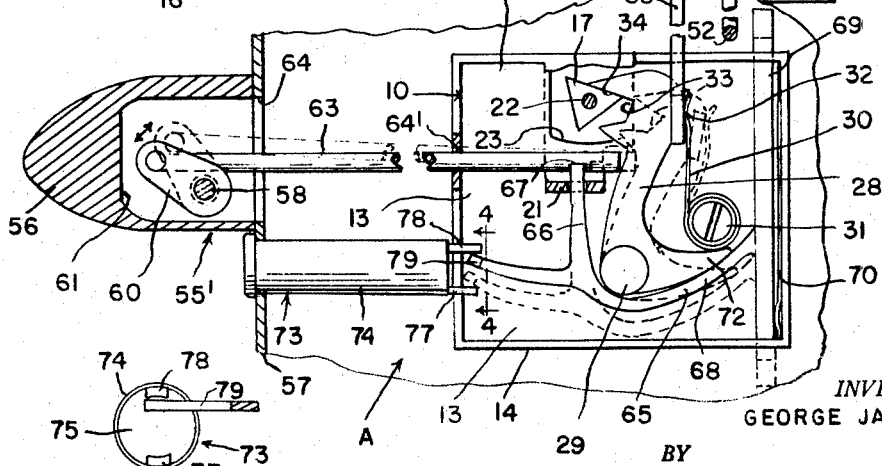
FIG.3.
FIG.4.
INVENTOR.
GEORGE JANONIS
BY
Whittemore, Hulbert & Belknap
ATTORNEYS Dec. 22, 1959     G. JANONIS     2,918,320
VEHICLE DOOR LATCH
Filed Sept. 17, 1956     2 Sheets-Sheet 2
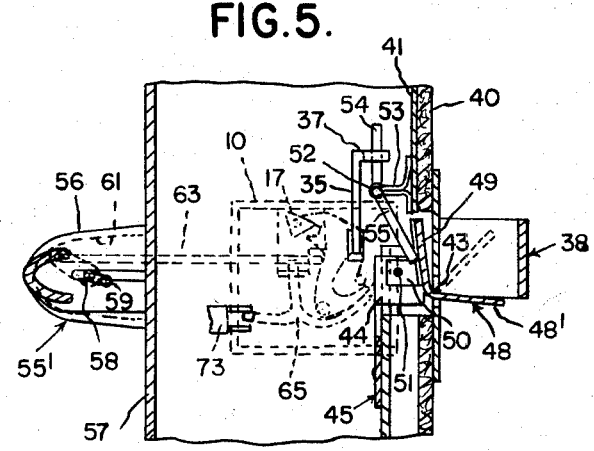
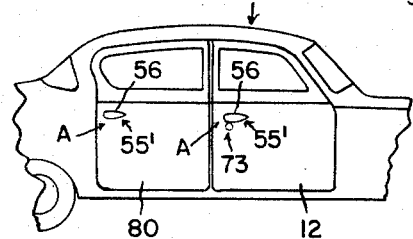
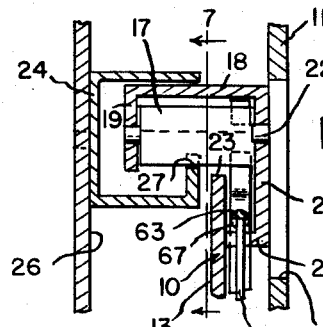
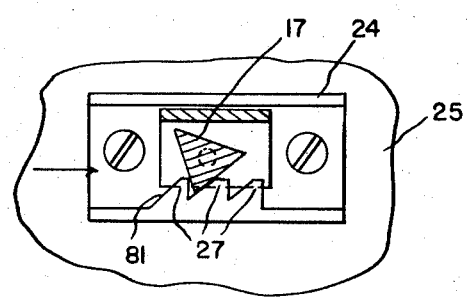
*INVENTOR.*
GEORGE JANONIS
BY
*Whittemore, Hulbert & Belknap*
ATTORNEYS

United States Patent Office 2,918,320
Patented Dec. 22, 1959

2,918,320

VEHICLE DOOR LATCH

George Janonis, Detroit, Mich.

Application September 17, 1956, Serial No. 610,189

16 Claims. (Cl. 292—280)

This invention relates to latch structure and refers more particularly to a vehicle door latch.

One object of this invention is to provide a vehicle door latch having a remote control operable from the inner side of the door and having an upwardly movable trip member or actuator, and a remote control link actuable by the trip member to release the latch.

Another object of the invention is to provide a vehicle door latch having an outside handle provided with an actuator which is especially easy to operate.

Still another object of the invention is to provide a vehicle door latch which is easy to install.

A further object of the invention is to provide a vehicle door latch which is composed of a relatively few simple parts and capable of being inexpensively manufactured.

These and other objects and novel features of construction will become more apparent as the following description proceeds especially when considered with the accompanying drawings, wherein:

Fig. 1 is a longitudinal horizontal sectional view through a vehicle door and door post, showing my latch structure associated therewith.

Fig. 2 is a view taken along the line 2—2 on Fig. 1, the inner door panel broken away.

Fig. 3 is a view taken along the line 3—3 on Fig. 1, the outer door edge broken away.

Fig. 4 is a view taken along the line 4—4 on Fig. 3.

Fig. 5 is a view taken along the line 5—5 on Fig. 1.

Fig. 6 is an enlargement of a portion of Fig. 2.

Fig. 7 is a view along the line 7—7 on Fig. 6.

Fig. 8 is a fragmentary elevation of a vehicle having the latch structure associated therewith.

Referring now more particularly to the drawings, the latch structure A includes a casing 10 rigidly secured to the outer or rear side of the swinging edge 11 of the front door 12 of a vehicle B. The casing is in the form of a flat rectangular plate 13 having flanges 14 along each of the four sides extending at right angles to the plate 13 toward the edge 11 of the door. The marginal edges of the flanges engage the edge 11 of the door, and the edge 11, flanges and plate 13 cooperate to define a chamber 16 for parts of the latch structure.

The latch structure includes a latch bolt 17 which is elongated in a forward and rearward direction and of equilateral triangular cross-section throughout its length. The casing has a part 18 which extends rearwardly from the upper edge of the plate 13 and has a down-turned end portion 19. A second part 20 extends downwardly from the free edge of the upper flange 14 of the casing in opposed relation to the depending part 19. The lower end of the part 20 is turned rearwardly as shown at 21 and engages the front or inner side of the plate 13. The latch bolt 17 has a pin 22 extending through it in a lengthwise direction, the opposite ends of the pin being journaled for rotation in the parts 19 and 20, respectively. The latch bolt 17 is thus supported on the casing for free rotation. Between the parts 19 and 20, the casing plate 13 is formed with an opening 23 to clear the latch bolt.

A keeper 24 is provided mounted on the door post or frame 25. The keeper is channel shaped and is secured in any suitable manner to the base of a recess 26 in the front edge 26' of the door post 25. The lower flange of the keeper has a series of teeth 27 along the front edge which project upwardly for cooperative engagement with the latch bolt.

A setting and release lever 28 is supported within the casing, being mounted for rotation on the pin 29 which is rigidly carried by the plate 13 of the casing. A spring 30 is carried by a pin 31 secured to plate 13, and the free end 32 of the spring bears against the lever 28 to urge it in a counterclockwise direction. The free end of lever 28 is formed with a recess 33, the upper side 34 of the recess being adapted to bear against one side of the latch bolt, as seen in full lines in Fig. 3, to prevent it from rotating in a counterclockwise direction. The lever 28 has an extension 35 which extends forwardly and into the door 12 through an opening 36 in the edge 11 thereof, the extension having an upwardly projecting portion which terminates in an inwardly extending apertured end 37.

The latch structure may be operated from inside the door by a remote control 38. The remote control includes a plate 39 which bears against the upholstery 40 on the inner side of the inner door panel 41 and has a channel-shaped strap-like handle 42 secured thereto, the handle extending horizontally. The plate 39 is formed with an opening 43 and a pair of laterally spaced ears 44 extend outwardly from opposite sides of the opening through the upholstery. A yoke-like mounting plate 45 is secured to the inner panel 41 within the door and has the laterally spaced flanges 46 extending inwardly from the adjacent edges of the arms 47 of the mounting plate, the flanges 46 being secured directly to the ears 44 of plate 39 through an opening in the inner panel. The remote control is provided with an actuator 48 which is in the form of a flat plate 48' normally extending generally horizontally and laterally inwardly and into the channel space defined by handle 42. The actuator 48 has an integral extension or tripper 49 which extends through the opening 43 in the mounting plate 39 and in a generally upward direction. The tripper 49 has a pair of laterally spaced ears 50 rotatably supported on the pin 51 which extends horizontally and parallel to the plane of the door, being secured to the ears 44. By reason of the fact that the actuator plate 48' has considerably more weight than the tripper 49, the actuator will normally swing to and assume the position illustrated in Fig. 5, limited by engagement of the tripper 49 with plate 39.

A remote control link 52 is provided, being supported within the door 12 for rotation by a mounting bracket 53 secured to the inner panel of the door. The link 52 has an upward extension 54 at one end which projects through and is loosely received in the aperture of the extension 37 of the setting and release lever. The other end of the link 52 terminates in a downward extension 55 engageable with the tripper. As viewed in Fig. 5, when the extension 54 is substantially vertical and exerting no appreciable force on the apertured extension 37, the other extension 55 is disposed at somewhat of an angle so that it engages the tripper 49 in the normal generally horizontal position of the actuator.

Operating mechanism 55' is provided for releasing the latch mechanism from the outside, including handle 56. The handle 56 is generally U-shaped and extends horizontally with the ends secured directly to the outer panel 57 of the door. The handle 56 has an actuator 58 in the form of an elongated rod which has its opposite ends journaled for rotation in the legs of the handle and extends horizontally and parallel to the plane of the door. The rod 58 has secured to it a U-shaped bar 59, the opposite ends of which are secured directly to the bar 58. The rod 58 carries a lever 60 which is rigidly secured to it. The lever 60 is located within a chamber 61 in one leg of the handle and the inner side of the chamber is open at 62 to clear rod 58. An actuator link 63 has one end pivotally secured to lever 60, the link extending from the handle through an opening 64 in the outer panel of the door. The link 63 projects into the housing 13 through an opening 64' in the outer flange of casing 10. The other end of the link 63 is engageable with the lever 28 to rotate the latter in a clockwise direction and thereby release the latch bolt to permit the door to be opened.

The latch structure also includes a locking member 65. The locking member 65 has a locking part 66 which projects upwardly through an opening in the part 21 for engagement with a notch 67 in the underside of link 63. The member 65 has an arcuate cam portion 68 extending from the locking part 66, and the opposite end of the cam portion being secured to the operating part 69. The operating part 69 is in the form of a straight rod which extends vertically within the casing 10 having its opposite ends projecting therebeyond through openings in the upper and lower flanges of the casing. A leaf spring 70 is disposed between the operating part 69 and the inner side flange of the casing to resist accidental sliding of the operating part. When the locking member 65 is in the lower or dotted line position of Fig. 3, it is ineffective to prevent opening of the door by the outside operating mechanism. However, when the member 65 is raised to the full line position, the upper end of locking part 66 will project into the registering notch 67 in link 63 to prevent the longitudinal movement of the link 63 and hence prevent opening of the door from the outside.

The lever 28 has a camming arm 72 engageable with the cam portion 68 of the locking member. When the door is opened by the inside remote control by merely gripping the handle 42 and pressing upwardly on the actuator plate 48', the lever 28 will be turned in a clockwise directon to release the latch bolt, and if at that time the locking member 65 is in the up or operative position, the camming arm 72 of the lever will operate to retract the locking member 65 to its lower or inoperative position.

The latch structure is also provided with a key operated lock 73 which has a sleeve 74 secured to the outer panel 57 of the door and a rotatable cylinder 75 within the sleeve carrying a pair of laterally spaced legs 77 and 78 for engagement with the lateral or forward extension 79 of the lock member 65. Suitable means such as a spring are employed to return the cylinder to the neutral position illustrated after operation by a key from the outside. When the key is inserted into the lock and turned in one direction, one leg of the cylinder will engage extension 79 to raise it to its operative or locking position, and when the key is rotated in the opposite direction, the other leg of the cylinder will engage extension 79 to move the lock member 65 to its inoperative position.

It will be apparent that the latch structure A may be employed either on the front door 12 of the vehicle B which normally has a key lock 73, or a rear door 80 which normally does not. In Fig. 8, the latch structure A is shown associated with the rear door 80.

The operation of the latch structure should be readily apparent. The door 12 (or 80) is latched closed by simply swinging it to the closed position illustrated in Fig. 1. As the door closes, the latch bolt 17 will cam over the inclined outer sides 81 of the teeth 27 of the keeper, the door and latch bolt moving in the direction of the arrow in Fig. 7. As the latch bolt cams over a tooth, it will rotate slightly in a clockwise direction and then snap counterclockwise into the space between that tooth and the next tooth. The lever 28 will permit this slight clockwise rotation of the latch bolt, but the spring 30, through the lever, urges the latch bolt to return in a counterclockwise direction to the position of Figs. 3 and 7. Further counterclockwise rotation of the latch bolt, from the position of Figs. 3 and 7, is however positively prevented by the engagement of surface 34 of the lever with the latch bolt. Hence the door is securely latched and the latch bolt held in latching position by the lever, so that the door cannot be opened after the latch bolt is engaged with the inner side of a tooth as in Fig. 7.

In order to open the door, the lever must be withdrawn against the action of spring 30 to the dotted line position of Fig. 3 to permit counterclockwise rotation of the latch bolt. Then the door may be pulled open, during which time the latch bolt will turn counterclockwise to clear the keeper teeth.

The lever 28 may be retracted by the inside remote control by merely turning the actuator 48 in an upward direction about its pivot to the dotted line position of Fig. 5, the actuator rotating the link 52 which in turn retracts the lever. The actuator will return to the full line position by gravity, and link 52 will be returned to the rotative position of Fig. 5 by the spring 30 through lever 28. The lever may also be retracted by the outside operating mechanism by merely rotating the actuator rod 58 in a clockwise direction (Fig. 3) to move link 63 inward against lever 28. This can be readily accomplished with the fingers pressing on rod 59 during normal gripping of handle 56. The spring 30, through lever 28, will return rod 58 to the normal position in which the lever 60 is in the solid line position of Fig. 3. The elongated slot in extension 37 permits operation by the operating mechanism without disturbing the remote control.

In the normal position of actuator rod 58 and link 63, shown in solid lines, the notch 67 is lined up with the vertical locking part 66 of lock member 65. Thus before the door is closed the member 65 may be raised to the operative solid line position of Fig. 3 manually by the operating part 69 to engage the upper end of the locking part 66 in the notch 67 and thereby prevent retraction of the lever 28 by the outside operating mechanism. The lock member may be shifted to its operative position by the key lock 73 when the door is open or closed.

When the lock member 65 is in its operative position, the lever 28 may be retracted and the door opened by the inside remote control 38, the camming portion 72 of the lever camming the lock member to its inoperative or dotted line position during its retracting movement.

It will be understood that if the lock member 65 is in the up or operative position when the door is closed, the slight clockwise rocking of the latch bolt will impart a correspondingly slight rocking movement to the lever 28, thus camming the lock member a very small amount toward its lower or inoperative position. The lock member will not be moved downwardly sufficiently to withdraw the locking part 66 from notch 67, however.

The latch structure between the door edge 11 and the post 25 is protected from rain and the like in the closed position of the door by the edge 90 of the door fitting closely in the recess 91 of the post 25.

What I claim as my invention is:

1. Latch structure for a door comprising a latch bolt on the door normally releasably held in latching position and movable to unlatching position when released, a keeper adjacent the door and cooperable with said latch bolt in the closed position of the door when said latch bolt is held in latching position to hold the door closed, means for releasing said latch bolt including remote control mechanism mounted on the door, said remote control mechanism including a manually operable actuator on the inner side of the door mounted for swinging movement about a horizontal axis generally parallel to the plane of the door, said releasing means being operative to release said latch bolt upon swinging movement of said actuator in an upward direction, and a handle in the form of a generally horizontal strap at the inner side of the door overlying the inner side of said actuator, the ends of said strap being turned toward and secured to the door.

2. Latch structure for a door comprising a latch bolt on the door, a keeper adjacent the door and cooperable with said latch bolt in the closed position of the door when said latch bolt is in latching position to hold the door closed, a pivotal setting and release lever carried by the door for swinging movement from an inoperative position to an operative position and effective in its operative position to hold said latch bolt in latching position, spring means urging said lever to its operative position, and means operative to move said lever to its inoperative position to release said latch bolt including remote control mechanism carried by the door and having a generally horizontal manually operable actuator at the inner side of the door, a link between said actuator and said lever operative to swing said lever to inoperative position upon movement of said link in one direction, means pivotally mounting said actuator for swinging movement about a generally horizontal axis extending parallel to the plane of the door, said actuator having an operating part extending inwardly from the pivot axis, said actuator being operative to move said link in said one direction upon upward swinging of said actuator, and a handle in the form of a generally horizontal strap on the inner side of the door overlying the inner side of said actuator, the ends of said strap being turned toward and secured to the door.

3. Latch structure for a vehicle door comprising a latch bolt on the door normally held in latching position, a keeper adjacent the door and cooperable with said latch bolt in the closed position of the door when said latch bolt is held in latching position to hold the door closed, means for releasing the latch bolt including operating mechanism mounted on the door, said operating mechanism including a generally horizontal actuator on the outer side of the door for manual operation mounted for swinging movement about a horizontal axis generally parallel to the plane of the door, said releasing means being operative to release said latch bolt upon downward swinging of said actuator, and a handle in the form of a generally horizontal strap on the outer side of the door overlying the outer side of said actuator, the ends of said strap being turned toward and secured to said door.

4. Latch structure for a door comprising a latch bolt on the door, a keeper adjacent the door and cooperable with said latch bolt in the closed position of the door when said latch bolt is in latching position to hold the door closed, a pivotal setting and release lever carried by the door for swinging movement from an inoperative position to an operative position and effective in its operative position to hold said latch bolt in latching position, spring means urging said lever to its operative position, and means operative to move said lever to its inoperative position to release said latch bolt including operating mechanism carried by the door and having a generally horizontal manually operable actuator at the outer side thereof mounted for swinging movement about a horizontal axis generally parallel to the plane of the door, a link between said actuator and lever operative to swing said lever to its inoperative position upon movement of said link in one direction, said actuator having an operating part extending inwardly toward the door from the pivot axis, said actuator being operative to move said link in said one direction upon vertical swinging of said actuator, and a handle in the form of a generally U-shaped strap on the outer side of the door overlying the outer side of said actuator, the ends of said strap being turned toward the door and secured thereto.

5. Latch structure for a door comprising a support mounted on the outer side of the swinging edge of the door, a latch bolt mounted on said support adapted to be releasably held in latching position and movable to unlatching position when released, a keeper adjacent the door and cooperable with said latch bolt in the closed position of the door when said latch bolt is held in latching position to hold the door closed, a setting and release member carried by said support for movement from an inoperative position to an operative position and effective in its operative position to hold said latch bolt in latching position, operating mechanism for said member operable from the outer side of said door and operative to move said member to inoperative position to release said latch bolt, and means for rendering said operating mechanism inoperative, said means being carried entirely by said support and comprising a manually operable lock member movable from an inoperative position to an operative position blocking operation of said operating mechanism.

6. Latch structure for a vehicle door comprising a casing mounted on the outer side of the swinging edge of the door between the inner and outer sides of the door, a latch bolt mounted on said casing adapted to be releasably held in latching position and movable to unlatching position when released, a keeper adjacent the door and cooperable with said latch bolt in the closed position of the door when said latch bolt is held in latching position to hold the door closed, a setting and release lever pivoted on said casing for swinging movement from an inoperative position to an operative position and effective in its operative position to hold said latch bolt in latching position, spring means urging said lever to operative position, operating mechanism for said lever operable from the outer side of the door and operative to move said lever to inoperative position to release said latch bolt, and means for rendering said operating mechanism inoperative, said means being carried entirely by said casing and comprising a manually operable lock member carried by said casing and movable from an inoperative position to an operative position blocking operation of said operating mechanism.

7. Latch structure for a vehicle door comprising a casing mounted on the outer side of the swinging edge of the door between the inner and outer sides of the door, a latch bolt mounted on said casing adapted to be releasably held in latching position and movable to unlatching position when released, a keeper adjacent the door and cooperable with said latch bolt in the closed position of the door when said latch bolt is held in latching position to hold the door closed, a setting and release lever pivoted on said casing for swinging movement from an inoperative position to an operative position and effective in its operative position to hold said latch bolt in latching position, spring means urging said lever to operative position, operating mechanism for said lever carried by the door including an actuator operable from the outer side of the door, a link operatively connected to said actuator operative to move said lever to inoperative position to release said latch bolt upon operation of said actuator, a manually operable lock member carried by said casing and movable from an inoperative position to an operative position in blocking relation to said link to prevent movement of said lever to inoperative position by said link, and remote control mechanism carried by said door and operable from the inner side thereof to move said lever to inoperative position, said lever having a cam portion engageable with said lock member to move the latter to inoperative position upon movement of said lever to inoperative position.

8. Latch structure for a vehicle door comprising a casing mounted on the outer side of the swinging edge of the door between the inner and outer sides of the door, a latch bolt mounted on said casing adapted to be releasably held in latching position and movable to unlatching position when released, a keeper adjacent the door and cooperable with said latch bolt in the closed position of the door when said latch bolt is held in latching position to hold the door closed, a setting and release lever pivoted on said casing for swinging movement from an inoperative position to an operative position and effective in its operative position to hold said latch bolt in latching position, spring means urging said lever to operative position, operating mechanism for said lever carried by the door including an actuator operable from the outer side of the door, a link operatively connected to said actuator operative to move said lever to inoperative position to release said latch bolt upon operation of said actuator, a manually operable lock member carried by said casing and movable from an inoperative position to an operative position in blocking relation to said link to prevent movement of said lever to inoperative position by said link, a handle carried by the door on the outer side thereof, said handle being in the form of a generally horizontal strap having the intermediate portion spaced outwardly from the door and having the end portions turned toward and secured to the door, said actuator extending between and being pivoted to said end portions for vertical swinging about an axis generally parallel to the plane of the door, remote control mechanism carried by the door including a second actuator operable from the inner side of the door and mounted for vertical swinging about an axis extending generally parallel to the plane of the door, a second link between said second actuator and lever operative to move said lever to inoperative position upon movement of said second link in one direction, said second link being movable in said one direction by said second actuator upon upward swinging of the latter, said lever having a cam portion engageable with said lock member to move the latter to inoperative position upon movement of said lever to inoperative position, and a handle on the inner side of the door overlying the inner side of said second actuator.

9. Latch structure for a door comprising a latch bolt on the door, a keeper adjacent the door and cooperable with said latch bolt in the closed position of the door to hold the door closed, means for rendering said latch bolt ineffective to hold the door closed in cooperation with the keeper including a manually operable actuator on one side of the door mounted for swinging movement about an axis generally parallel to the plane of the door, said means being operative to render said latch bolt ineffective in response to swinging of said actuator about said axis, and a handle mounted on said one side of the door in overlying relation to said actuator, said handle being elongated from end to end in the direction of the axis of swinging movement of said actuator and having its ends turned toward and secured to the door beyond the opposite ends of said actuator.

10. Latch structure as defined in claim 9 in which said axis and said handle extend horizontally.

11. Latch structure as defined in claim 10 in which said actuator is normally generally horizontal and said means is operative to render said latch bolt ineffective in respond to upward swinging of said actuator.

12. Latch structure as defined in claim 10 in which said actuator is normally generally horizontal and said means is operative to render said latch bolt ineffective in response to downward swinging of said actuator.

13. Latch structure for a door comprising a latch bolt on the door, a keeper adjacent the door and cooperable with said latch bolt in the closed position of the door to hold the door closed, means for rendering said latch bolt ineffective to hold the door closed in cooperation with the keeper including a manually operable remote control actuator on the inner side of the door mounted for swinging movement about a horizontal axis parallel to the plane of the door, said means being operative to render said latch bolt ineffective in response to swinging of said actuator about said axis, and a handle mounted on the inner side of the door in overlying relation to said actuator, said handle being horizontally elongated from end to end in the direction of said axis and having its ends turned toward and secured to the door beyond the ends of said actuator.

14. Latch structure as defined in claim 13 in which said actuator is normally generally horizontal and said means is operative to render said latch bolt ineffective in response to upward swinging of said actuator.

15. Latch structure for a door comprising a latch bolt on the door, a keeper adjacent the door and cooperable with said latch bolt in the closed position of the door to hold the door closed, means for rendering said latch bolt ineffective to hold the door closed in cooperation with the keeper including a manually operable actuator on the outer side of the door mounted for swinging movement about a horizontal axis parallel to the plane of the door, said means being operative to render said latch bolt ineffective in response to swinging of said actuator about said axis, and a handle mounted on the outer side of the door in overlying relation to said actuator, said handle being horizontally elongated from end to end in the direction of said axis and having its ends turned toward and secured to the door beyond the ends of said actuator.

16. Latch structure as defined in claim 15 in which said actuator is normally generally horizontal and said means is operative to render said latch bolt ineffective in response to downward swinging of said actuator.

References Cited in the file of this patent

UNITED STATES PATENTS

| | | |
|---|---|---|
| 2,094,413 | Schonitzer | Sept. 28, 1937 |
| 2,117,160 | Gale | May 10, 1938 |
| 2,256,909 | Rightmyer | Sept. 23, 1941 |
| 2,304,145 | Borchers | Dec. 8, 1942 |
| 2,488,213 | Lutz et al. | Nov. 15, 1949 |
| 2,716,569 | Roethel | Aug. 30, 1955 |

FOREIGN PATENTS

| | | |
|---|---|---|
| 160,147 | Australia | Dec. 7, 1954 |
| 632,123 | Great Britain | Nov. 16, 1949 |